(12) United States Patent
Veeraraghavan et al.

(10) Patent No.: US 12,189,805 B2
(45) Date of Patent: Jan. 7, 2025

(54) SYSTEM OF RECORD AGNOSTIC DATA ENTITLEMENT API

(71) Applicant: ADP, Inc., Roseland, NJ (US)

(72) Inventors: Vijayanand Veeraraghavan, Chennai (IN); Haribabu Mohan, Chennai (IN); Mogana Rangan, Chennai (IN)

(73) Assignee: ADP, Inc., Roseland, NJ (US)

( * ) Notice: Subject to any disclaimer, the term of this patent is extended or adjusted under 35 U.S.C. 154(b) by 393 days.

(21) Appl. No.: 17/655,219

(22) Filed: Mar. 17, 2022

(65) Prior Publication Data

US 2023/0297712 A1 Sep. 21, 2023

(51) Int. Cl.
| | |
|---|---|
| H04L 29/06 | (2006.01) |
| G06F 16/242 | (2019.01) |
| G06F 21/62 | (2013.01) |
| G06F 21/64 | (2013.01) |
| G06F 40/186 | (2020.01) |

(52) U.S. Cl.
CPC ...... *G06F 21/6227* (2013.01); *G06F 16/2433* (2019.01); *G06F 21/64* (2013.01); *G06F 40/186* (2020.01)

(58) Field of Classification Search
CPC .. G06F 21/6227; G06F 16/2433; G06F 21/64; G06F 40/186
See application file for complete search history.

(56) References Cited

U.S. PATENT DOCUMENTS

| | | | |
|---|---|---|---|
| 10,586,061 B2* | 3/2020 | Wu | G06F 21/6227 |
| 2016/0132552 A1* | 5/2016 | Xue | G06F 16/2423 |
| | | | 707/766 |
| 2018/0173477 A1* | 6/2018 | Porwal | G06F 3/1287 |
| 2019/0377891 A1* | 12/2019 | Krieger | G06F 21/6227 |
| 2022/0300497 A1* | 9/2022 | Pansare | G06N 20/00 |
| 2022/0398258 A1* | 12/2022 | Eberlein | G06F 16/287 |

* cited by examiner

*Primary Examiner* — William A Corum, Jr.
(74) *Attorney, Agent, or Firm* — Foley & Lardner LLP (57) ABSTRACT

Controlling access to a system of record is provided. The method comprises receiving an API request from an endpoint to an SOR for data associated with a customer, wherein the endpoint belongs to a partner of the customer. A determination is made if the endpoint is entitled to access the data in the SOR, wherein entitlement is provided by a data entitlement template defined by the customer. Responsive to a determination the endpoint is entitled to access the customer data in the SOR, the SOR is queried based on the API request. When an SOR response is received a number of response filters are applied to the SOR response, wherein the response filters are specified in the data entitlement template according to an SOR-agnostic schema. The filtered SOR response is then forwarded to the endpoint.

30 Claims, 6 Drawing Sheets

SYSTEM OF RECORD AGNOSTIC DATA ENTITLEMENT API

BACKGROUND INFORMATION

1. Field

The present disclosure relates generally to accessing a system of record (SOR), and in particular, to managing entitlements of business partners of SOR customers to access SOR data.

2. Background

A system of record (SOR) such as a human capital management system (HCM) may serve thousands of customers across multiple countries. An SOR may maintain country and customer specific data in a structured query language (SQL) database. As SOR customer team with partners and other third parties, there is increasing need to expose data from the SOR through a marketplace API. An important prerequisite for exposing data is to build data security around the SOR information exposed to partners through the marketplace API in accordance with rules such as General Data Protection Regulation (GDPR).

Therefore, it would be desirable to have a method and apparatus that take into account at least some of the issues discussed above, as well as other possible issues. For example, it would be desirable to have a method and apparatus that automate data management process.

SUMMARY

An illustrative embodiment provides a computer-implemented method for controlling access to a system of record. The method comprises receiving an API request from an endpoint to an SOR for data associated with a customer, wherein the endpoint belongs to a partner of the customer. A determination is made if the endpoint is entitled to access the data in the SOR, wherein entitlement is provided by a data entitlement template defined by the customer. Responsive to a determination the endpoint is not entitled to access the customer data in the SOR, the API request is denied. Responsive to a determination the endpoint is entitled to access the customer data in the SOR, the SOR is queried based on the API request. When an SOR response is received a number of response filters are applied to the SOR response, wherein the response filters are specified in the data entitlement template according to an SOR-agnostic schema. The filtered SOR response is then forwarded to the endpoint.

Another illustrative embodiment provides a system for controlling access to a system of record. The system comprises a storage device configured to store program instructions and one or more processors operably connected to the storage device and configured to execute the program instructions to cause the system to: receive, from an endpoint, an application programming interface (API) request to a system of record (SOR) for data associated with a customer, wherein the endpoint belongs to a partner of the customer; determine if the endpoint is entitled to access the data in the SOR, wherein entitlement is provided by a data entitlement template defined by the customer; responsive to a determination the endpoint is not entitled to access the customer data in the SOR, deny the API request; responsive to a determination the endpoint is entitled to access the customer data in the SOR, query the SOR based on the API request; receiving an SOR response; apply a number of response filters to the SOR response, wherein the response filters are specified in the data entitlement template according to an SOR-agnostic schema; and forwarding the filtered SOR response to the endpoint.

Another illustrative embodiment provides a computer program product for controlling access to a system of record. The computer program product comprises a computer-readable storage medium having program instructions embodied thereon to perform the steps of: receiving, from an endpoint, an application programming interface (API) request to a system of record (SOR) for data associated with a customer, wherein the endpoint belongs to a partner of the customer; determining if the endpoint is entitled to access the data in the SOR, wherein entitlement is provided by a data entitlement template defined by the customer; responsive to a determination the endpoint is not entitled to access the customer data in the SOR, denying the API request; responsive to a determination the endpoint is entitled to access the customer data in the SOR, querying the SOR based on the API request; receiving an SOR response; applying a number of response filters to the SOR response, wherein the response filters are specified in the data entitlement template according to an SOR-agnostic schema; and forwarding the filtered SOR response to the endpoint.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that there is increasing need to expose data from the SOR through a marketplace application programming interface (API) As SOR customer team with partners and other third party vendors.

Illustrative embodiments also recognize and take into account that exposing system of record (SOR) data to third parties through a marketplace API requires building data security around the SOR in accordance with, e.g., General Data Protection Regulation (GDPR) rules. The illustrative embodiments also recognize and take into account that some SORs such as a human capital management (HCM) system may be a multi-country product and therefore employ different schema and entities for different countries.

The illustrative embodiments also recognize and take into account that implementing data security directly on an SOR may require significant time and effort and imposes significant overhead on the SOR for partners and third parties that do not use the system.

The illustrative embodiments provide a method and system that defines data entitlement templates based on a domain driven model for partner and third-party systems on API endpoints exposed by an SOR through a marketplace. An entitlement engine processes incoming requests based on the endpoints and applies SOR-agnostic security entitlements to SOR data exposed to partners and third parties according to the entitlements associated with the partners and their endpoints.

Figure 1:
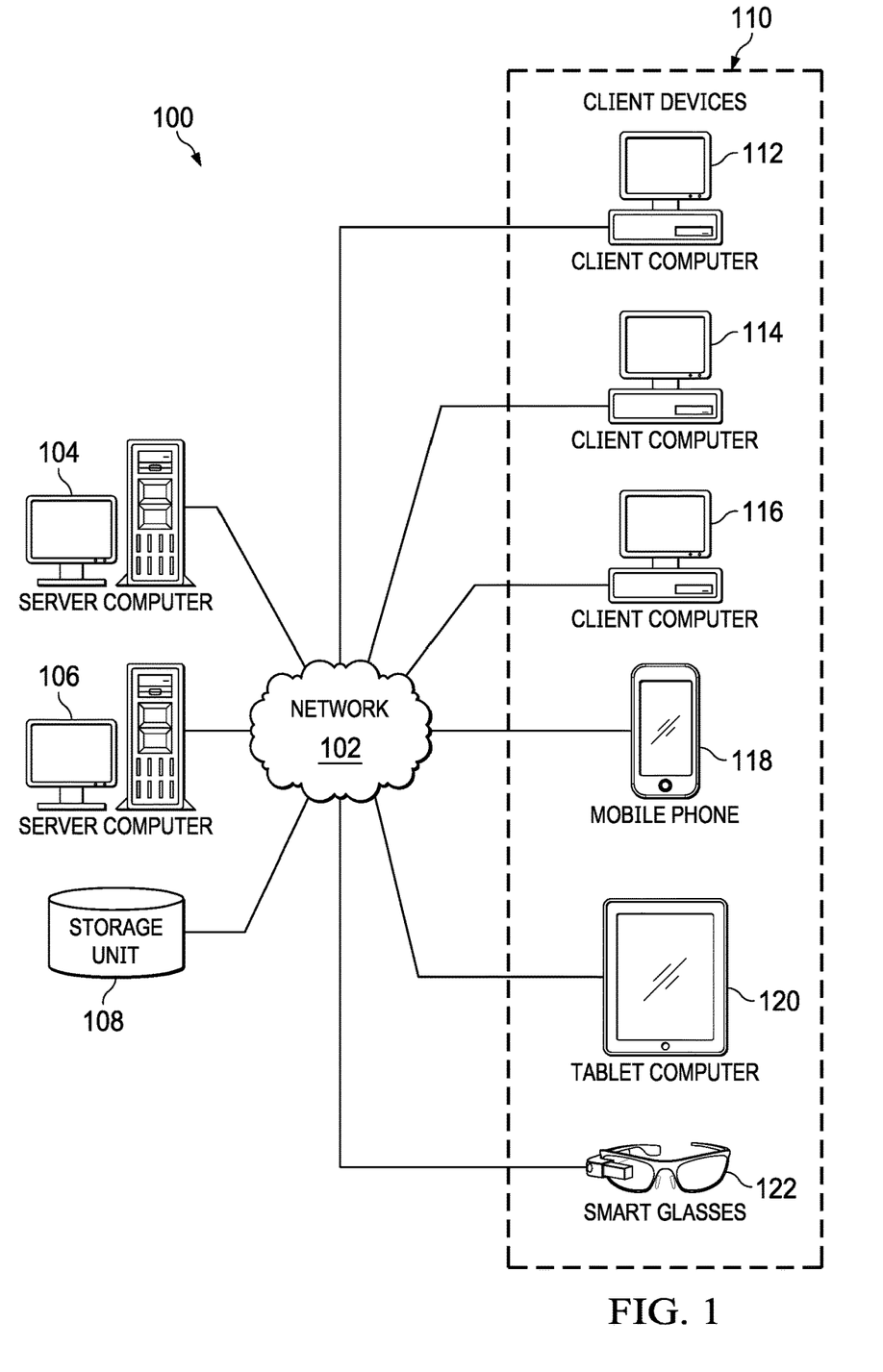
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

In the illustrative example, a "number of" when used with reference to items means one or more items. For example, a number of different types of networks is one or more different types of networks.

Legacy SORs may be highly customizable, which may be further complicated in the case of multinational products that use different schema and entities for different countries. Considerable time and effort to implement data security for the partners and third-party integration systems on the HCM system and adds to the overhead of the SOR.

The illustrative embodiments are completely metadata, template, and mapping driven and solve the technical problem of configuring different data entitlement policies for different partners and customers as well as sharing a partner template across all customers of the partner. The illustrative embodiments also allow defining data entitlement templates at the country level for a multinational customer, e.g., configuring data entitlement templates differently for the United Kingdom customers versus customers in the Netherlands. The security template may be defined at the common level and then overridden at the country level.

Figure 2:
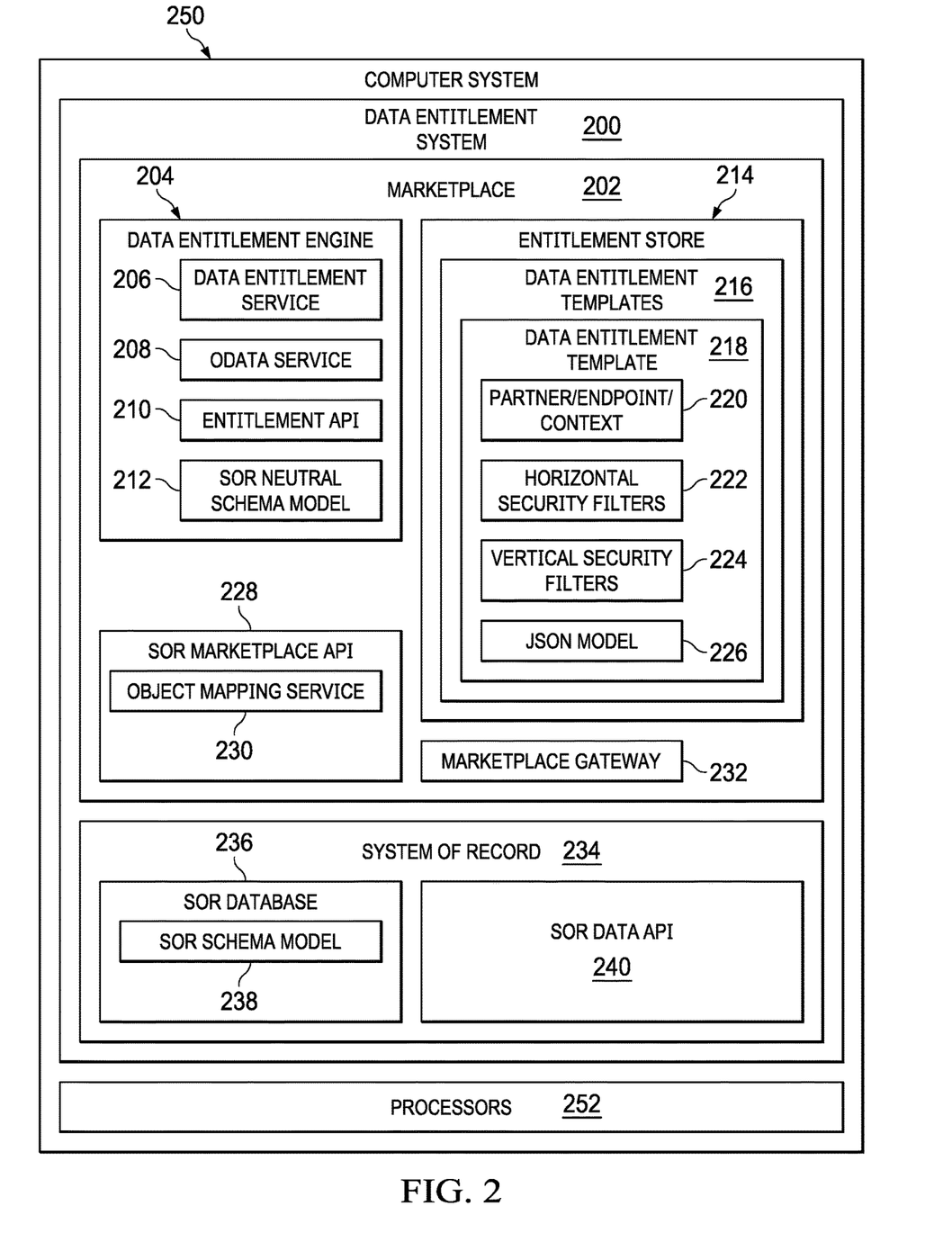
FIG. 2 depicts a block diagram illustrating a data entitlement system in accordance with an illustrative embodiment.

FIG. 2 depicts a block diagram illustrating a data entitlement system in accordance with an illustrative embodiment. Data entitlement system 200 may be implemented in network data processing system 100 shown in FIG. 1.

Data entitlement system 200 comprises marketplace 202, which contains data entitlement engine 204, entitlement store 214, SOR marketplace API 228, and marketplace gateway 232.

Data entitlement engine 204 comprises data entitlement 206, open data protocol (ODATA) service 208, and entitlement API 210. Data entitlement engine 204 employs an SOR neutral schema model 212.

Entitlement store 214 hosts a number of data entitlement templates 216. Each data entitlement template 218 is defined for a specific combination of partner, endpoint, and context (e.g., country). Data entitlement template 218 may comprise a number of horizontal (row level) security filters 222 and vertical (field level) security filters 224. Data entitlement policies are stored for each partner against a JavaScript Object Notation (JSON) model 226.

SOR marketplace API 228 comprises object mapping service 230 that translates between the SOR neutral schema model 212 of the data entitlement engine 204 and the SOR schema model 238.

Marketplace gateway 232 passes queries and response between the data entitlement engine 204 and partners/third-party systems that are attempting to access the SOR 234.

SOR 234 comprises SOR database 236, which employs a specific SOR schema model 238. SOR data API passes queries and responses between data entitlement engine 204 and SOR 234.

Data entitlement system 200 can be implemented in software, hardware, firmware, or a combination thereof. When software is used, the operations performed by data entitlement system 200 can be implemented in program code configured to run on hardware, such as a processor unit. When firmware is used, the operations performed by data entitlement system 200 can be implemented in program code and data and stored in persistent memory to run on a processor unit. When hardware is employed, the hardware may include circuits that operate to perform the operations in data entitlement system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components for data entitlement system 200 can be located in computer system 250, which is a physical hardware system and includes one or more data processing systems. When more than one data processing system is present in computer system 250, those data processing systems are in communication with each other using a communications medium. The communications medium can be a network. The data processing systems can be selected from at least one of a computer, a server computer, a tablet computer, or some other suitable data processing system.

For example, data entitlement system 200 can run on one or more processors 252 in computer system 250. As used herein a processor is a hardware device and is comprised of hardware circuits such as those on an integrated circuit that respond and process instructions and program code that operate a computer. When processors 252 execute instructions for a process, one or more processors can be on the same computer or on different computers in computer system 250. In other words, the process can be distributed between processors 252 on the same or different computers in computer system 250. Further, one or more processors 252 can be of the same type or different type of processors 252. For example, one or more processors 252 can be selected from at least one of a single core processor, a dual-core processor, a multi-processor core, a general-purpose central processing unit (CPU), a graphics processing unit (GPU), a quantum processing unit (QPU), a digital signal processor (DSP), or some other type of processor.

Figure 3:
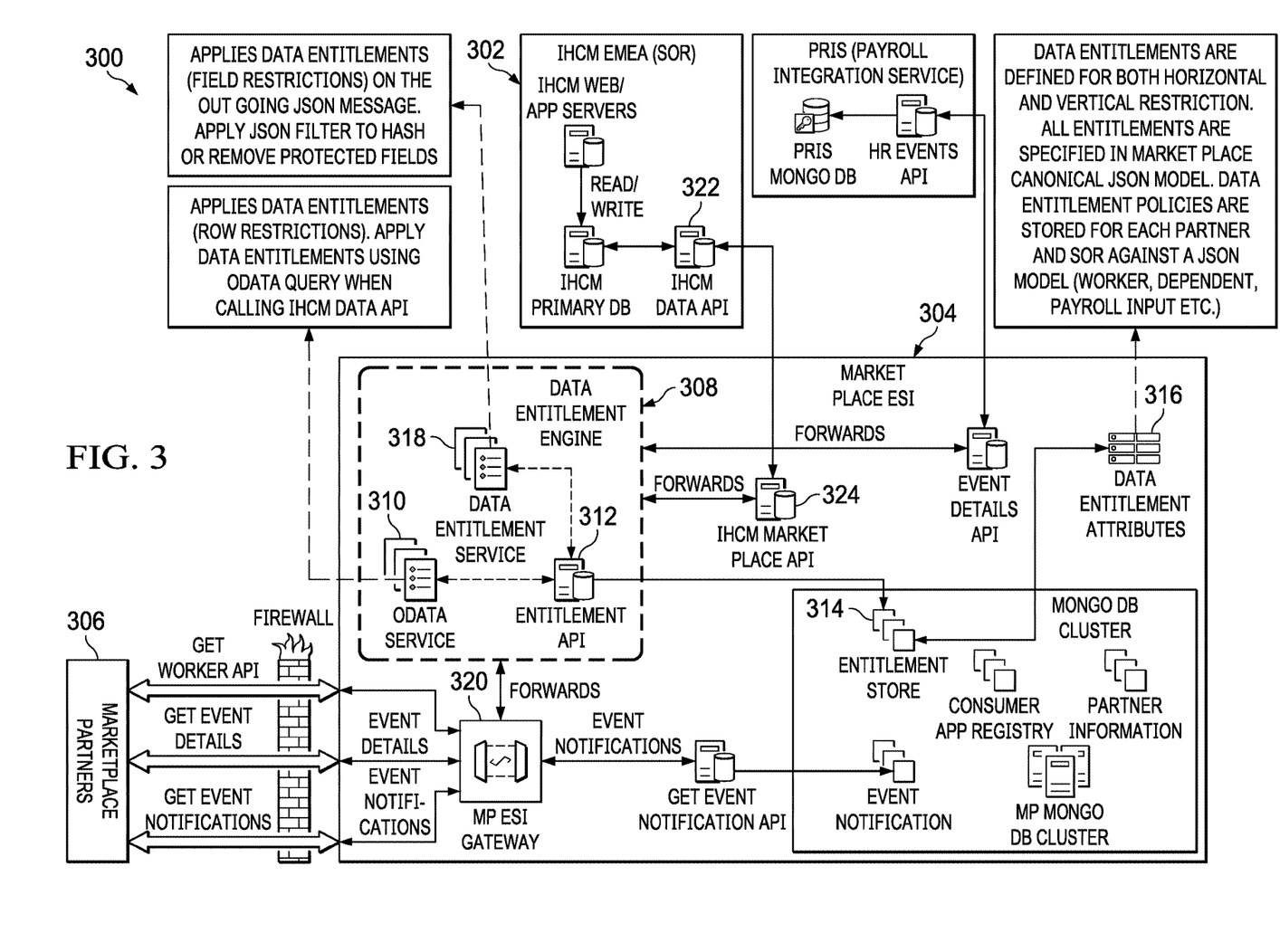
FIG. 3 depicts a diagram illustrating an architecture for implementing SOR-agnostic data entitlements in accordance with an illustrative embodiment.

FIG. 3 depicts a diagram illustrating an architecture for implementing SOR-agnostic data entitlements in accordance with an illustrative embodiment. Architecture 300 is an example implementation of data entitlement system 200 in FIG. 2.

Architecture 300 automatically understands the domain driven enterprise model schema and helps create data security rules in accordance with customer consent and GDPR rules. Architecture 300 allows the creation of data entitlement templates for a schema and apply the security filters to all the endpoints bound to that schema. The entitlement templates may include horizontal as well as vertical data restriction. The horizontal data restriction may be implemented using ODATA filters. Vertical data restriction may be implemented using response message filtering.

Architecture comprises SOR 302, which may be accessed through marketplace 304 by marketplace partners 306. SOR 302 might be, e.g., an HCM system hosting employee data for a number of customers. For example, marketplace partners 306 may partner with customers to provide promotions or third-party services to employees of the customers, which is facilitated through marketplace 304, which allows customers and partners to find each other. As part of such promotions or services, customers must expose some SOR data to the marketplace partners 306 while maintaining data security in compliance with a number of regulatory rules, e.g., GDPR.

Data entitlement engine 308 acts as an entitlement proxy layer and applies security features to conform with customer consent and regulatory rules when exposing customer SOR data to partners 306 through marketplace 304.

Data entitlement engine 308 receives incoming SOR requests from a marketplace gateway 320 and identifies the entitlement template related to the incoming SOR request by reducing the metadata by matching the request headers and endpoint response schema. Entitlement API 312 in data entitlement engine 308 accesses the entitlement template from entitlement store 314, which stores data entitlement attributes 316 of partners 306. Data entitlements may be defined for both horizontal and vertical restriction. All entitlements may be specified in a marketplace canonical JSON model. Data entitlement policies are stored for each partner and SOR against a JSON model (e.g., worker, dependent, payroll input, etc.).

ODATA service 310 in data entitlement engine 308 builds queries for the specific endpoint by intelligently converting the data entitlement template to an ODATA query. The ODATA query is used to construct a structured query language (SQL) query against the SOR 302 by using mapping information to retrieve only the require data from SOR 302 as agreed to by the customer and partner. ODATA service 310 applies row restrictions with the ODATA query when calling SOR data API 322 through marketplace API 324. An object mapping service in marketplace API 324 converts the request from a common schema model to an SOR schema model. For example, if the template filter is defined as Worker.People.CityName-eq'London' it gets translated in the SQL query as SELECT People_Id from PEOPLE where CityName='London' to apply the security filter.

Data retrieved from SOR 302 passes back through data entitlement engine 308, where data entitlement service 318 applies data security response filters to the response content before sending the data to marketplace gateway 320 for return to the endpoint that submitted the SOR request. Data entitlement service 318 applies field restrictions on the outgoing JSON message by applying a JSON filter to hash or remove protected fields.

Architecture 300 avoids the need for developers to write code for each SOR and define the data security on the SOR schema that is not meaningful for a partner or third-party integration system. Architecture 300 provides a universal method to define entitlement templates and policies that can be shared and used across any SOR such as HCM systems. Architecture 300 can be used to apply data security rules between any SOR and any integration partners in any defined schema model.

The template approach allows HCM systems to share data entitlement policies across several customers that integrate with partner or third-party systems. This approach also eliminates the need to develop entitlement solutions for different SORs. The partner templates can be reused across more than one SOR that shares the same partners. Architecture 300 can apply any entitlement changes made for a partner across all customers without having to develop or deploy any code.

The illustrative embodiments treat any response from the SOR as a dynamic object model that has no schema and produces an accurate response by apply data entitlement policies as specified by the customer. The illustrative embodiments handle application of different data security templates for different country data in the case of multinational customers.

Figure 4:
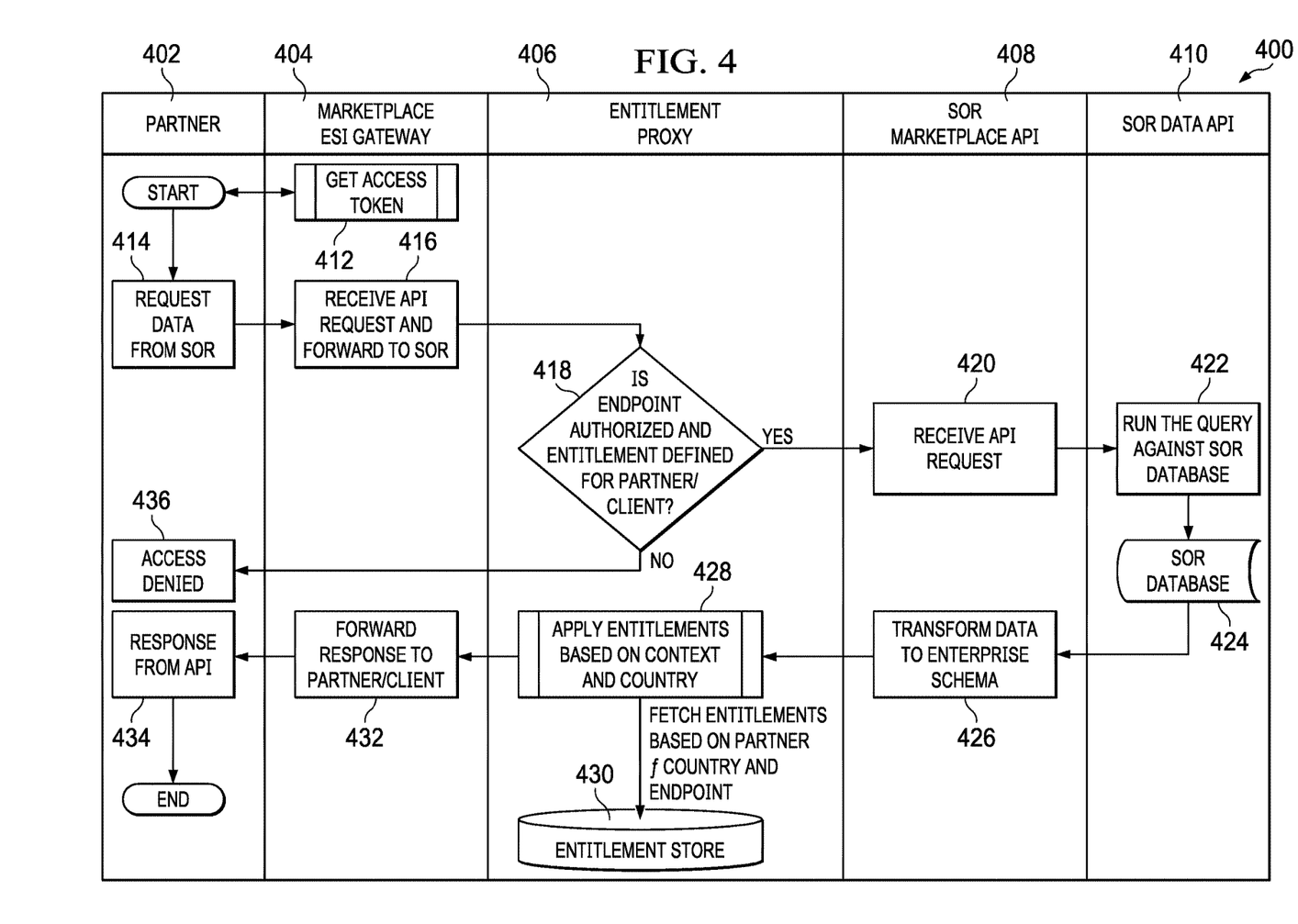
FIG. 4 depicts a flow diagram illustrating the interaction of an SOR-agnostic data entitlement system in accordance with an illustrative embodiment.

FIG. 4 depicts a flow diagram illustrating the interaction of an SOR-agnostic data entitlement system in accordance with an illustrative embodiment. Process flow 400 may be an example of the operation of architecture 300 in FIG. 3.

Marketplace gateway 404 provides an access token 412 to a partner 402 seeking to access the SOR. The partner 402 then sends an SOR data request 414 to the marketplace gateway 404, which receives and forward 416 an API request to the SOR.

Entitlement proxy (data entitlement engine) 406 receives the API request from the marketplace 404 and determines 418 if the endpoint submitting the SOR request is authorized and if an entitlement is defined for the partner 402. If the endpoint is not authorized, the entitlement proxy 406 denies access 436.

If the endpoint is authorized and there is a defined entitlement, the entitlement proxy 406 forwards an API request to an SOR marketplace API 408, which receives the request 420 and converts the query to the SOR schema model before forwarding it to the SOR data API 410. SOR data API 410 runs the query 422 against the SOR database 424.

The SOR marketplace API 408 transforms data 426 from the SOR schema model to a common enterprise schema model understood by entitlement proxy 406.

Entitlement proxy 406 fetches entitlements from entitlement store 430 and applies data entitlements 428 to the SOR response based on the context of the partner, country, and endpoint.

Marketplace gateway 404 forwards 432 the response from the entitlement proxy 406 to the partner 402, which receives the response 434 from the marketplace gateway 404.

Figure 5:
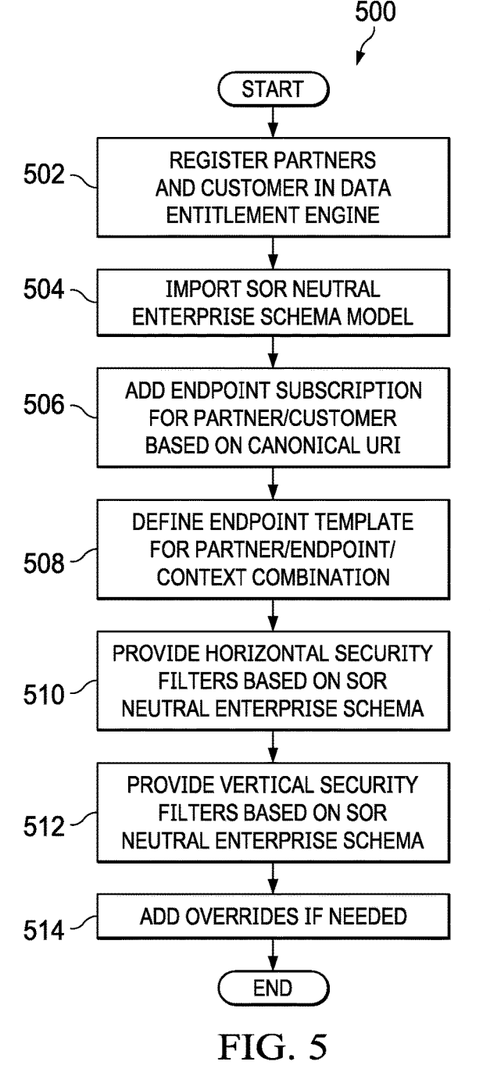
FIG. 5 depicts a flowchart illustrating a process for establishing data entitlements in accordance with illustrative embodiments.

FIG. 5 depicts a flowchart illustrating a process for establishing data entitlements in accordance with illustrative embodiments. Process 500 can be implemented in hardware, software, or both. When implemented in software, the process can take the form of program code that is run by one of more processor units located in one or more hardware devices in one or more computer systems. Process 600 may be implemented in data entitlement system 200 in FIG. 2 and data entitlement engine 308 in FIG. 3. Process 500 may be used to set up the data entitlements that will be applied to incoming SOR requests from partners.

Process 500 begins by registering partners and customers in the data entitlement engine (step 502). An SOR neutral (agnostic) enterprise schema model is imported (step 504).

Process 500 then adds endpoint subscriptions for partner/customer relationships based on canonical universal resource locators (URI) (step 506). An endpoint template is then defined for combinations of partner/customer/context (e.g., country) (step 508).

Horizontal (row level) security filers are provided based on the SOR neutral enterprise schema (step 510). Vertical (field level) security filters are also provides based on the SOR neutral enterprise schema model (step 512).

Process 500 may also add overrides if needed (step 514). The data entitlement templates may be overridden at the country level. Common fields may be defined on the multinational context and then certain fields overridden at the country level. For example, date of birth may be specified as a field on the data entitlement template for the UK but need not be specified for the Netherlands. A template may also be overridden at the partner and customer level. The customer may override the master template for specific partners. If a partner is common to multiple customers and some customers opt not to send a field that is defined in the common template, a customer can override that decision and send the field.

Process 500 then ends.

Figure 6:
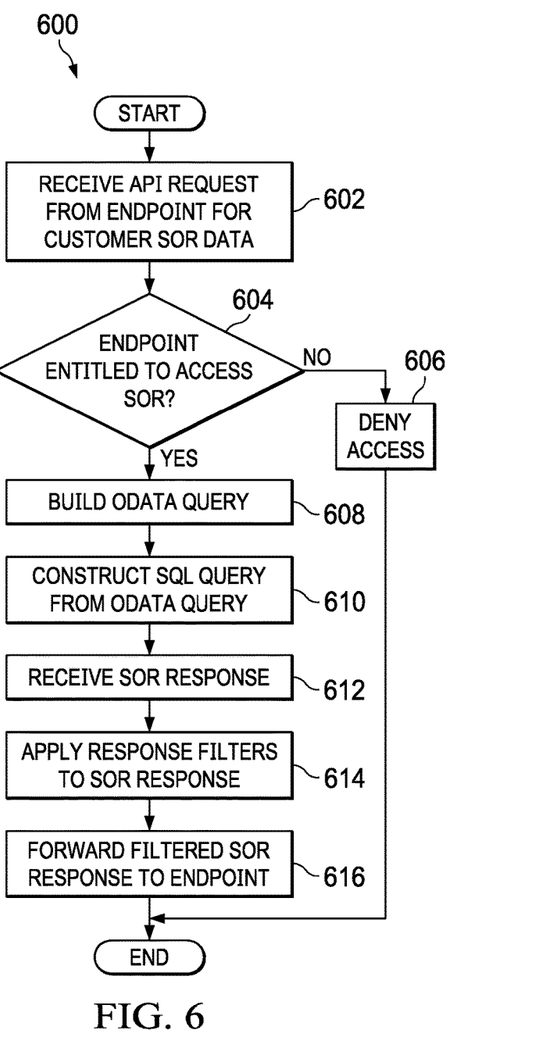
FIG. 6 depicts a flowchart illustrating a process for applying SOR-agnostic data entitlements in accordance with illustrative embodiments.

FIG. 6 depicts a flowchart illustrating a process for applying SOR-agnostic data entitlements in accordance with illustrative embodiments. Process 600 can be implemented in hardware, software, or both. When implemented in software, the process can take the form of program code that is run by one of more processor units located in one or more hardware devices in one or more computer systems. Process 600 may be implemented in data entitlement system 200 in FIG. 2 and data entitlement engine 308 in FIG. 3. Process 600 is an example implementation of data flow 400 in FIG. 4.

Process 600 begins with the data entitlement engine receiving an API request from an endpoint to an SOR for data associated with a customer, wherein the endpoint belongs to a partner of the customer (step 602). The SOR may be an HCM system.

The data entitlement engine determines if the endpoint is entitled to access the data in the SOR (step 604). Entitlement may be provided by a data entitlement template defined by the customer. The customer may override policies defined in the entitlement template. The data entitlement template may be identified by matching request headers and an endpoint response schema contained in metadata of the API request.

Responsive to a determination the endpoint is not entitled to access the customer data in the SOR, the data entitlement engine denies the API request (step 604), and process 600 ends.

Responsive to a determination the endpoint is entitled to access the customer data in the SOR, the data entitlement engine queries the SOR based on the API request. The data entitlement engine builds an ODATA query based on the entitlement template (step 608). The data entitlement engine then constructs an SQL query from the ODATA query, wherein only data agreed upon by the customer and partner is included in the SQL query according to mapping information contained in the data entitlement template (step 610).

After receiving an SOR response to the SQL query (step 612) the data entitlement engine applies a number of response filters to the SOR response, wherein the response filters are specified in the entitlement template according to an SOR-agnostic schema (step 614). The response filters may hash or remove protected fields of data from the SOR response.

The response filters may be based on the partner, country of origin of the API request, and endpoint. Data entitlement policies for the partner and SOR may be stored against a JavaScript Object Notation (JSON) model in an entitlement schema store. Entitlement supports both horizontal and vertical restriction of data according to the response filters and query options. Entitlement supports both masking and hiding data that the partner is not entitled to access as agreed by the customer.

The data entitlement engine forwards the filtered SOR response to the endpoint (step 616). Process 600 terminates thereafter.

Figure 7:
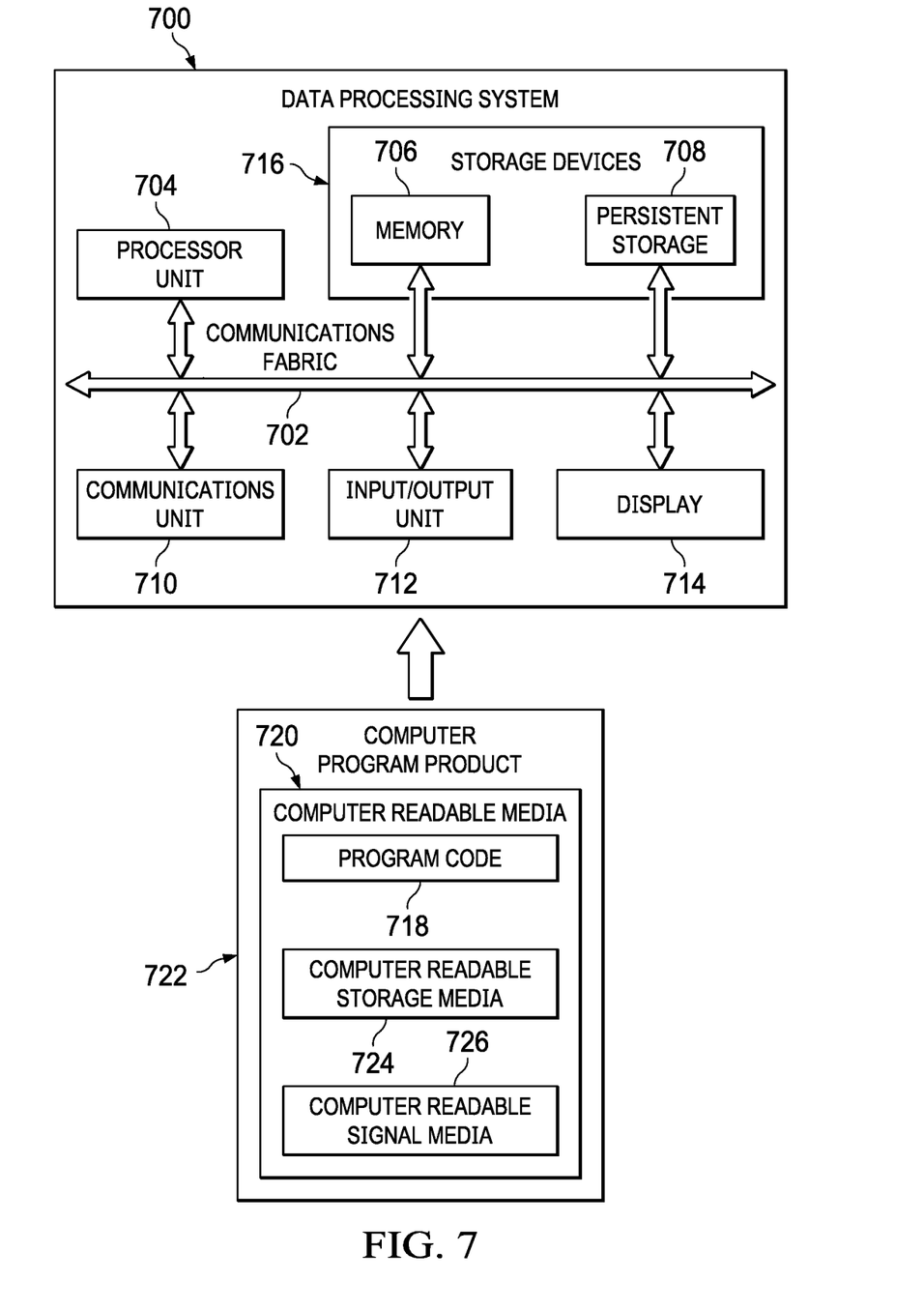
FIG. 7 is an illustration of a block diagram of a data processing system in accordance with an illustrative embodiment.

Turning now to FIG. 7, an illustration of a block diagram of a data processing system is depicted in accordance with an illustrative embodiment. Data processing system 700 may be used to implement one or more computers and client devices 110 and servers 104, 106 in FIG. 1 and data entitlement system 200 in FIG. 2. In this illustrative example, data processing system 700 includes communications framework 702, which provides communications between processor unit 704, memory 706, persistent storage 708, communications unit 710, input/output unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation. In an embodiment, processor unit 704 comprises one or more conventional general-purpose central processing units (CPUs). In an alternate embodiment, processor unit 704 comprises one or more graphical processing units (GPUs).

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708. Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer-usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In one example, computer-readable media 720 may be computer-readable storage media 724 or computer-readable signal media 726.

In these illustrative examples, computer-readable storage media 724 is a physical or tangible storage device used to store program code 718 rather than a medium that propagates or transmits program code 718. Alternatively, program code 718 may be transferred to data processing system 700 using computer-readable signal media 726.

Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for controlling access to a system of record, the method comprising:
using a number of processors to perform the steps of:
receiving, from an endpoint, an application programming interface (API) request to a system of record (SOR) for customer data associated with a customer, wherein the endpoint belongs to a partner of the customer;
determining if the endpoint is entitled to access the customer data in the SOR, wherein entitlement is provided by a data entitlement template defined by the customer;
responsive to a determination the endpoint is not entitled to access the customer data in the SOR, denying the API request;
responsive to a determination the endpoint is entitled to access the customer data in the SOR, querying the SOR based on the API request, wherein querying the SOR comprises:
building an open data protocol (ODATA) query based on the data entitlement template; and
constructing a structured query language (SQL) query from the ODATA query, wherein only the customer data agreed upon by the customer and the partner is included in the SQL query according to mapping information contained in the data entitlement template;
receiving an SOR response;
applying a number of response filters to the SOR response, wherein the response filters are specified in the data entitlement template according to an SOR-agnostic schema; and
forwarding the filtered SOR response to the endpoint.

2. The method of claim 1, wherein the response filters are based on the partner, country of origin of the API request, and the endpoint.

3. The method of claim 1, wherein the data entitlement template is identified by matching request headers and an endpoint response schema contained in metadata of the API request.

4. The method of claim 1, wherein data entitlement policies for the partner and SOR are stored against a JavaScript Object Notation (JSON) model in an entitlement schema store.

5. The method of claim 1, wherein the SOR is a Human Capital Management system.

6. The method of claim 1, wherein the response filters remove protected fields of customer data from the SOR response.

7. The method of claim 1, wherein the response filters hash protected fields in the SOR response.

8. The method of claim 1, wherein the customer can override data entitlement policies defined in the data entitlement template.

9. The method of claim 1, wherein the data entitlement template supports both horizontal and vertical restriction of customer data according to the response filters and query options.

10. The method of claim 1, wherein the data entitlement template supports both masking and hiding customer data that the partner is not entitled to access as agreed by the customer.

11. A system for controlling access to a system of record, the system comprising:
a storage device configured to store program instructions; and
one or more processors operably connected to the storage device and configured to execute the program instructions to cause the system to:
receive, from an endpoint, an application programming interface (API) request to a system of record (SOR) for customer data associated with a customer, wherein the endpoint belongs to a partner of the customer;
determine if the endpoint is entitled to access the customer data in the SOR, wherein entitlement is provided by a data entitlement template defined by the customer;
responsive to a determination the endpoint is not entitled to access the customer data in the SOR, deny the API request;
responsive to a determination the endpoint is entitled to access the customer data in the SOR, query the SOR based on the API request, wherein to query the SOR, the one or more processors are configured to cause the system to:
build an open data protocol (ODATA) query based on the data entitlement template; and
construct a structured query language (SQL) query from the ODATA query, wherein only the customer data agreed upon by the customer and the partner is included in the SQL query according to mapping information contained in the data entitlement template;

receive an SOR response;

apply a number of response filters to the SOR response, wherein the response filters are specified in the data entitlement template according to an SOR-agnostic schema; and forward the filtered SOR response to the endpoint.

12. The system of claim 11, wherein the response filters are based on the partner, country of origin of the API request, and the endpoint.

13. The system of claim 11, wherein the data entitlement template is identified by matching request headers and an endpoint response schema contained in metadata of the API request.

14. The system of claim 11, wherein data entitlement policies for the partner and SOR are stored against a JavaScript Object Notation (JSON) model in an entitlement schema store.

15. The system of claim 11, wherein the SOR is a Human Capital Management system.

16. The system of claim 11, wherein the response filters remove protected fields of customer data from the SOR response.

17. The system of claim 11, wherein the response filters hash protected fields in the SOR response.

18. The system of claim 11, wherein the customer can override data entitlement policies defined in the data entitlement template.

19. The system of claim 11, wherein the data entitlement template supports both horizontal and vertical restriction of customer data according to the response filters and query options.

20. The system of claim 11, wherein the data entitlement template supports both masking and hiding customer data that the partner is not entitled to access as agreed by the customer.

21. A computer program product for controlling access to a system of record, the computer program product comprising:

a non-transitory computer-readable storage medium having program instructions embodied thereon to perform the steps of:

receiving, from an endpoint, an application programming interface (API) request to a system of record (SOR) for customer data associated with a customer, wherein the endpoint belongs to a partner of the customer;

determining if the endpoint is entitled to access the customer data in the SOR, wherein entitlement is provided by a data entitlement template defined by the customer;

responsive to a determination the endpoint is not entitled to access the customer data in the SOR, denying the API request;

responsive to a determination the endpoint is entitled to access the customer data in the SOR, querying the SOR based on the API request, wherein querying the SOR comprises:

building an open data protocol (ODATA) query based on the data entitlement template; and constructing a structured query language (SQL) query from the ODATA query, wherein only the customer data agreed upon by the customer and the partner is included in the SQL query according to mapping information contained in the data entitlement template;

receiving an SOR response;

applying a number of response filters to the SOR response, wherein the response filters are specified in the data entitlement template according to an SOR-agnostic schema; and forwarding the filtered SOR response to the endpoint.

22. The computer program product of claim 21, wherein the response filters are based on the partner, country of origin of the API request, and the endpoint.

23. The computer program product of claim 21, wherein the data entitlement template is identified by matching request headers and an endpoint response schema contained in metadata of the API request.

24. The computer program product of claim 21, wherein data entitlement policies for the partner and SOR are stored against a JavaScript Object Notation (JSON) model in an entitlement schema store.

25. The computer program product of claim 21, wherein the SOR is a Human Capital Management system.

26. The computer program product of claim 21, wherein the response filters remove protected fields of customer data from the SOR response.

27. The computer program product of claim 21, wherein the response filters hash protected fields in the SOR response.

28. The computer program product of claim 21, wherein the customer can override data entitlement policies defined in the data entitlement template.

29. The computer program product of claim 21, wherein the data entitlement template supports both horizontal and vertical restriction of customer data according to the response filters and query options.

30. The computer program product of claim 21, wherein the data entitlement template supports both masking and hiding customer data that the partner is not entitled to access as agreed by the customer.

* * * * *